Oct. 26, 1937.  B. ROMAN  2,096,825

PRESERVED MULTIPLE COURSE DINNER

Filed July 25, 1929

INVENTOR
Benjamin Roman

Patented Oct. 26, 1937

2,096,825

UNITED STATES PATENT OFFICE 2,096,825

PRESERVED MULTIPLE COURSE DINNER

Benjamin Roman, New York, N. Y.

Application July 25, 1929, Serial No. 380,846

1 Claim. (Cl. 206—47)

This invention relates to a preserved multiple course dinner. At the present time food is preserved by canning only a unitary article thereof, such as soup, vegetable, or fruit in an individual container, and while these containers and contents constitute a valuable appendage of food for a dinner they fail to supply a complete meal, as in case the consumer should want to make up the same he would have to purchase several cans, open up each of them, perhaps heat one or more of them, empty the contents into separate dishes, and finally wash and dry the dishes. In most cases it would be difficult for the consumer to find a store which carries all the appurtenant canned articles of food which would make up an acceptable full meal, lunch, or dinner. In other cases the consumer would have to visit several stores to bring the necessary canned articles together for making up a complete meal.

It is the object of this invention to provide a preserved full dinner canned in an integral container or dish, whereby upon removal of the cover of such container the consumer would be at once served with all the various courses comprising a full dinner. The container would also serve directly as the general dish for the foods making up the dinner, and upon completion of the meal the dish could be discarded, without necessitating any dish washing labors.

Other objects and advantages will hereinafter appear.

In the accompanying drawing,—

Figure 1:
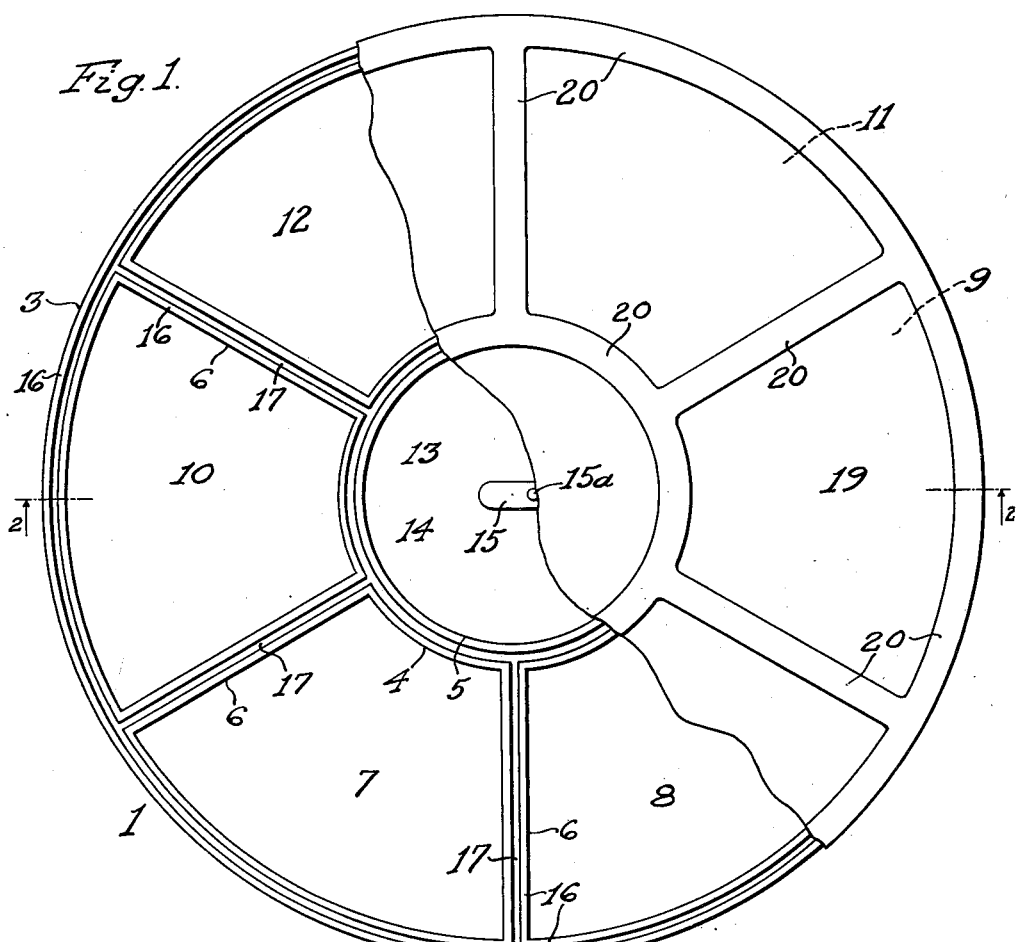
Fig. 1 shows a plan view of the invention, with the cover of the dish shown partially broken away for clearness of illustration.
Figure 2:
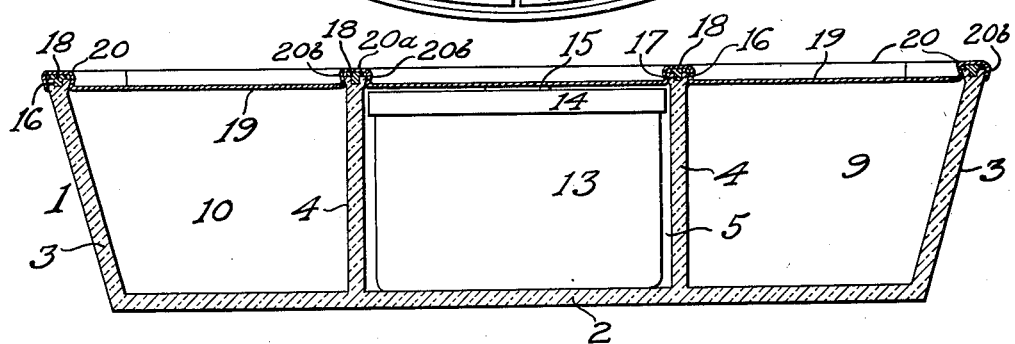
Fig. 2 is a cross-sectional elevation of the container shown in Fig. 1.

The container 1 proper preferably consists of glass, porcelain, or any other substance suitable for use as a dining dish, and comprises a floor 2, an annular wall 3, a circular wall 4 forming a central receptacle 5, and a plurality of walls 6 extending radially and joining the wall 5 with the outer wall 3 and thereby forming a series of receptacles 7, 8, 9, 10, 11, 12, which surround the chamber 5. The receptacles 7 to 12, being completely impervious from each other, may be filled with food courses comprising a full dinner, which by way of suggestion may consist of a principal dish such as meat or fish in the receptacle 7, soup in chamber 8, vegetable in receptacle 9, toast in receptacle 10, fruit or pudding in receptacle 11, and cake in receptacle 12. In the receptacle 5 is contained a cup 13 having a suitable tightly sealed cap or closure 14 and a lap 15, secured at 15a, for its convenient withdrawal from the chamber, and this cup may hold coffee or any other desired dinner beverage. The upper rims 16 of the walls 3, 4, 6 may be provided with grooves 17 adapted to receive a sealing gasket 18 of rubber or any other suitable substance, and the rims may be flared upwardly in the manner shown. A suitable cover 19 made of sheet metal may be formed out by proper dies to the approximate configuration shown in Figs. 1, 2, providing ribs 20 which follow the contour of the rims 16 of the walls 3, 4, 6. The cover 19 may be placed over the dish 1 by slipping the ribs 20 over the rims 16, and a suitable sealing die may be then applied to the cover 19 for pressing tightly the tops 20a of the ribs against the gaskets 18 and the sides 20b of the ribs, which are initially vertical, may be bent obliquely as shown against the tapering surfaces of the flared rims 16, in which manner an efficient hermetic seal may be provided for the cover 19 over the dish 1, which seal will render each of the receptacles 5, 7, 8, 9, 10, 11, 12 completely impervious to and from each other and hermetically sealed to and from each other, as well as from the exterior of the dish 1. The aforesaid closing and hermetic sealing operation may be performed with any known suitable machinery under a vacuum, so as to produce a vacuumed sealing of each of the said receptacles to and from each other, as well as from the exterior of the dish 1. After the dish has been thus filled by the manufacturer with the aforesaid food courses and hermetically and vacuum sealed as aforesaid by the manufacturer, it may be conveniently handled in trade in the same manner as any ordinary canned goods and may be so purchased by the consumer. After obtaining these goods, the user may remove the cover 19 in any well known ordinary manner, and he may then withdraw the cup 13 from the receptacle 5, remove its cap 14, and proceed to consume the full dinner with the separate use of the coffee or beverage of cup 13. In consuming the contents the person dining may utilize the empty receptacle 5 as a convenient holder for anything inedible, as for bones, pits, etc. The consumer may either heat the container 1 in an oven or cool it in a refrigerator before opening it, according to desires, nature of contents, or the seasonal requirements. He may also consume the contents in their normal temperature while heating or cooling the beverage of cup 13 before opening it.

The container and preserved full dinner of this invention is very useful and convenient in all circumstances or conditions, but is particularly desirable and useful in non-housekeeping homes and apartments, or for picnicking, boating, and camping, or wherever a good and complete meal is not otherwise obtainable.

While one mode of hermetically sealing the container is here shown, it will be evident that any one of the well known methods of hermetic sealing suitable for the needs of this invention may be resorted to by the manufacturer, so long as the receptacles 5 and 7 to 12 are each rendered impervious and hermetically sealed under vacuum to and from each other and from the exterior.

Variations may be resorted to within the scope of the invention, and portions of the improvements may be used without others.

Having thus described my invention, I claim:—

A multiple course dinner preserved and canned in an integral compound dish in which walls separate said dish into a plurality of receptacles adapted to hold the various courses of the dinner, said receptacles being non-intercommunicating and impervious to and from each other, a covering with sealing means for the dish rendering each of said receptacles impervious from the others irrespective of the disposition of the dish, said covering and sealing means also effecting the food preservation of the contents of each of said receptacles against the influence of the other receptacles and the exterior, a sealed beverage cup, and one of said receptacles holding said cup.

BENJAMIN ROMAN.